M. H. KNIGHT.
FENCE POST.

No. 182,680. Patented Sept. 26, 1876.

Attest:
Wm Bagger
C. A. Snow

Inventor:
Moses H. Knight,
by Louis Bagger
his Atty.

UNITED STATES PATENT OFFICE.

MOSES H. KNIGHT, OF POTOSI, ILLINOIS.

IMPROVEMENT IN FENCE-POSTS.

Specification forming part of Letters Patent No. 182,680, dated September 26, 1876; application filed February 23, 1876.

*To all whom it may concern:*

Be it known that I, MOSES H. KNIGHT, of Potosi, in the county of Livingston and State of Illinois, have invented certain new and useful Improvements in Fence-Posts; and I do hereby declare that the following is a full, clear, and exact description thereof, which will enable others skilled in the art to which it appertains to make and use the same, reference being had to the accompanying drawing and to the letters of reference marked thereon, which form a part of this specification, and in which—

Figure 1:
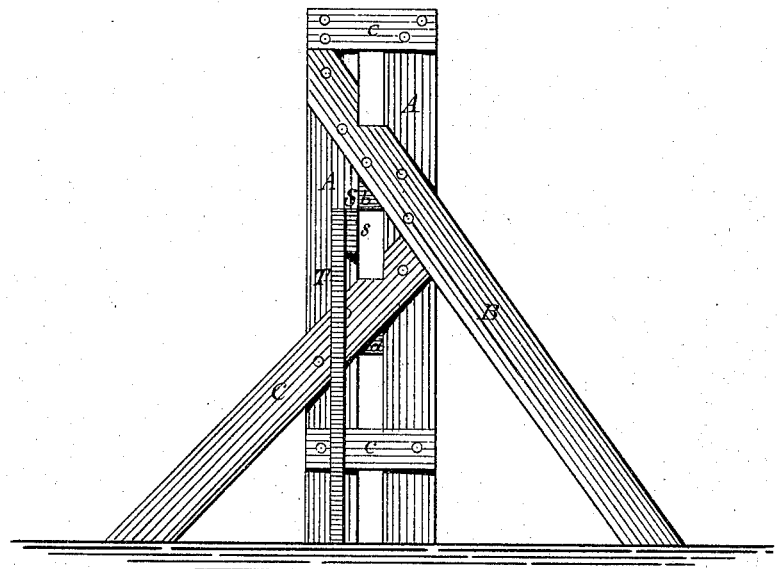
Figure 2:
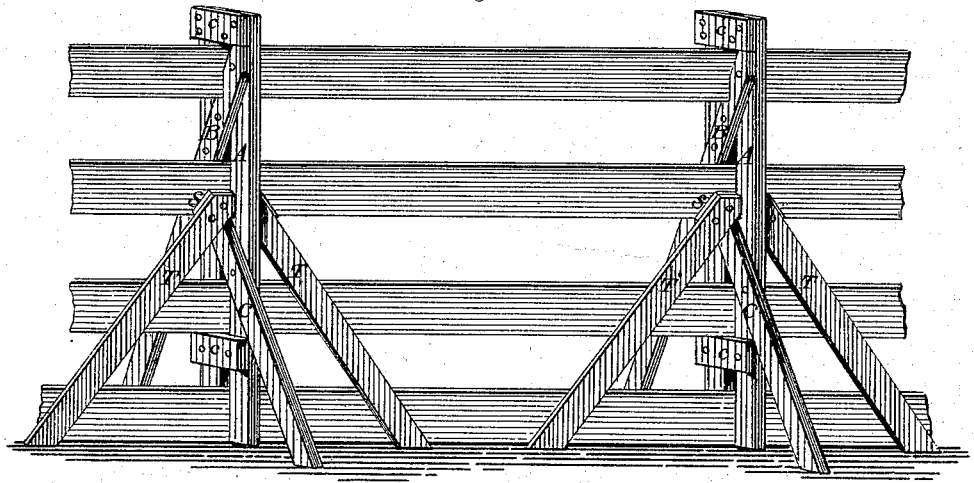

Figure 1 is a side view of my improved fence-post, and Fig. 2 is a perspective view of part of a fence having my improved posts.

Similar letters of reference indicate corresponding parts in both the figures.

The object of my invention, which relates more especially to that class of fences which are built of boards, is to provide posts for supporting the same, that may be easily, cheaply, and quickly constructed, and may be readily removed from place to place, as occasion requires. This I accomplish in the manner hereinafter more fully shown and described.

In the drawing, A A are two planks or boards, of suitable dimensions, their length being equal to the height the fence is desired to have. These are placed upon the ground endwise, as shown in the drawing, with their edges facing, and at a distance from each other sufficient to allow the insertion between them of the boards that are to form the fence. Across them, at or near the top and bottom, are nailed cross-pieces $c$ $c$, to keep them in a proper position in relation to each other. B is a brace, of about the same dimensions as planks A, fastened across them, as shown, so as to form the support for the top board. Under it and between posts A may be inserted a block, $b$, in order to strengthen it, and to prevent it from being displaced by the weights of the boards. The second board rests upon a brace, C, secured across posts A at an angle to B, as shown. A block, $d$, similar to block $b$, may be inserted under it for the same purpose. The lower boards of the fence are rested upon cross-pieces D, nailed across A A or upon the ground. In one of the planks A I cut a mortise, $s$, large enough to accommodate a strip, S, to which is secured braces T T, which rest upon the ground, thus preventing the post from falling sidewise. Strip S is prevented from slipping out of mortise $s$ by the boards forming the fence, which, when inserted, will keep it securely in place.

From the foregoing description, and by reference to the drawing, the mode of using my improved fence-posts will be readily understood. Two of them are placed upon the ground at a suitable distance from each other, and the boards F are then inserted into the mortises $a$. The fence is prevented from tipping over by the braces B C, which just reach the ground on each side, while the boards, when inserted, will prevent the posts from falling sidewise. Posts may now be added on either side, and fence thus extended to any desired length.

In order to prevent the boards from sliding out, they may be secured by wedges $e$, or they may be notched at the ends, as shown at $f$. When desirable, in order to effectually prevent the fence from tipping over, the braces B C may be secured to the ground by stakes $g$ driven in at suitable intervals.

Having thus described my invention, I claim and desire to secure by Letters Patent of the United States—

In a board fence, the combination of upright posts A A, having cross-pieces $c$ $c$, and braces B C with the strip S and braces T T, substantially as and for the purpose herein shown and specified.

In testimony that I claim the foregoing as my own I have hereto affixed my signature in presence of two witnesses.

MOSES H. KNIGHT.

Witnesses:
  CHARLES W. KING,
  ALFRED B. DAVIDSON.